United States Patent
Zhang et al.

(10) Patent No.: US 11,993,108 B2
(45) Date of Patent: May 28, 2024

(54) MONITORING METHOD AND DEVICE BASED ON RADIO FREQUENCY TECHNOLOGY

(71) Applicant: Hamaton Automotive Technology Co., Ltd., Hangzhou (CN)

(72) Inventors: Jianer Zhang, Hangzhou (CN); Zenan Hu, Hangzhou (CN); Mingguang Yu, Hangzhou (CN)

(73) Assignee: HAMATON AUTOMOTIVE TECHNOLOGY CO., LTD. (CN)

( * ) Notice: Subject to any disclaimer, the term of this patent is extended or adjusted under 35 U.S.C. 154(b) by 0 days.

(21) Appl. No.: 17/919,191

(22) PCT Filed: Dec. 29, 2021

(86) PCT No.: PCT/CN2021/142355
§ 371 (c)(1),
(2) Date: Oct. 14, 2022

(87) PCT Pub. No.: WO2023/087496
PCT Pub. Date: May 25, 2023

(65) Prior Publication Data
US 2024/0042810 A1    Feb. 8, 2024

(30) Foreign Application Priority Data

Nov. 16, 2021    (CN) .......................... 202111358046.7

(51) Int. Cl.
B60C 23/04    (2006.01)
(52) U.S. Cl.
CPC ................................ B60C 23/0452 (2013.01)
(58) Field of Classification Search
None
See application file for complete search history.

(56) References Cited

U.S. PATENT DOCUMENTS 7,518,493 B2 *    4/2009    Bryzek ............... B60C 23/0408
340/447
9,764,606 B2 *    9/2017    Makin ................. B60C 23/0469
(Continued)

FOREIGN PATENT DOCUMENTS

| CN | 102770289 A | 11/2012 |
|---|---|---|
| CN | 108122401 A | 6/2018 |

OTHER PUBLICATIONS

Extended European Search Report for Application No. 21950364.6-1206/4207695 PCT/CN2021142355, dated Jan. 15, 2024, 8 pages, EPO.

*Primary Examiner* — Peter J Macchiarolo
*Assistant Examiner* — Jermaine L Jenkins
(74) *Attorney, Agent, or Firm* — Jaffery Watson Mendonsa & Hamilton LLP

(57) ABSTRACT

The present application provided a monitoring method and a monitoring device based on RF technology, where the monitoring method includes: collecting monitoring information of a target object through a MEMS chip; and outputting a pulse sequence carrying the monitoring information to an oscillator and a power amplifier in a RF circuit through the MEMS chip, where the monitoring information is characterized through the pulse sequence by a time interval between two adjacent pulses; and modulating a phase of a generated carrier by the oscillator according to the pulse sequence, and amplifying a modulated signal by the power amplifier, so that an amplified signal is transmitted through an antenna; where the MEMS chip works in an operation mode when outputting a high level of the pulse sequence, and in an idle mode when outputting a low level of the pulse sequence or ending outputting the pulse sequence.

8 Claims, 4 Drawing Sheets

(56) References Cited

U.S. PATENT DOCUMENTS

| | | | |
|---|---|---|---|
| 10,052,922 B2* | 8/2018 | Lemense | B60C 23/0461 |
| 10,284,120 B2* | 5/2019 | Moiraghi | B60C 23/0493 |
| 10,295,500 B2* | 5/2019 | Makin | H02J 7/0042 |
| 11,021,021 B1* | 6/2021 | Nicula | B60C 19/00 |
| 2007/0125161 A1 | 6/2007 | Bryzek et al. | |
| 2012/0274461 A1 | 11/2012 | Colombo et al. | |
| 2017/0250633 A1 | 8/2017 | Moiraghi et al. | |
| 2022/0379670 A1* | 12/2022 | Kandler | B60C 23/0444 |

* cited by examiner

MONITORING METHOD AND DEVICE BASED ON RADIO FREQUENCY TECHNOLOGY

CROSS-REFERENCE TO RELATED APPLICATION

The present application claims priority to PCT Application No. PCT/CN2021/142355, filed on Dec. 29, 2021, entitled "Monitoring Method and Device Based on Radio Frequency Technology", and Chinese Application No. 202111358046.7, filed on Nov. 16, 2021, entitled "Monitoring Method and Device Based on Radio Frequency Technology", which is hereby incorporated by reference in its entity.

TECHNICAL FIELD

The present application relates to the technical field of radio frequency, in particular to a monitoring method and a monitoring device based on radio frequency technology.

BACKGROUND

The existing monitoring devices in monitoring systems based on pulse position modulation (PPM) wireless measurement technology, such as monitoring devices in tire pressure monitoring system (TPMS), mostly have sensors and microcontroller unit (MCU) chips mounted on a printed circuit board (PCB), and connected by wires on the PCB. The information collected by the sensors is processed by the microprocessor, then processed information is modulated by the radio frequency circuit, and a modulated signal is amplified, and finally, an amplified signal is sent through an antenna.

However, a plurality of chips being installed on the same printed circuit board will make the monitoring device larger and unable to meet the requirements of miniaturization of the monitoring device. Meanwhile, each of the chips has its own sleep current and wake-up current, and the total current of the monitoring device is equal to the sum of the current consumed by each chip, resulting a large power consumption of the monitoring device, which cannot meet the requirements of low power consumption of the monitoring device.

SUMMARY

The present application provides a monitoring method and a monitoring device based on radio frequency (RF) technology.

In a first aspect, the present application provides a monitoring method based on RF technology, including:
  collecting monitoring information of a target object through a micro-electro-mechanical system (MEMS) chip; and
  outputting a pulse sequence carrying the monitoring information to an oscillator and a power amplifier in an RF circuit through the MEMS chip, where the monitoring information is characterized through the pulse sequence by a time interval between two adjacent pulses; modulating a phase of a generated carrier by the oscillator according to the pulse sequence, and amplifying a modulated signal by the power amplifier, so that an amplified signal is transmitted through an antenna; where the MEMS chip works in an operation mode when the MEMS chip outputs a high level of the pulse sequence; and the MEMS chip works in an idle mode when the MEMS chip outputs a low level of the pulse sequence or ends outputting the pulse sequence.

According to the monitoring method based on RF technology provided by the present application, after the collecting monitoring information of a target object through a MEMS chip, the method further includes:
  encapsulating the monitoring information into a data packet through the MEMS chip according to a preset communication protocol, where the communication protocol is preset based on a pulse position offset algorithm;
  the outputting a pulse sequence carrying the monitoring information to an oscillator and a power amplifier in an RF circuit through the MEMS chip, includes:
  determining the time interval between the two adjacent pulses in the pulse sequence through the MEMS chip according to the data packet, and outputting the pulse sequence to the oscillator and the power amplifier in the RF circuit.

According to the monitoring method based on RF technology provided by the present application, the encapsulating the monitoring information into a data packet according to the preset communication protocol, includes:
  dividing one-byte data corresponding to the monitoring information into two half-byte data;
  determining hexadecimal data corresponding to divided half-byte data;
  obtaining a corresponding time interval according to a product of the hexadecimal data and a preset time base, so that only four pulses are required to transmit one-byte data; and encapsulating the obtained time interval into the data packet.

According to the monitoring method based on RF technology provided by the present application, the outputting a pulse sequence carrying the monitoring information to an oscillator and a power amplifier in an RF circuit through the MEMS chip, further includes:
  correcting an internal clock frequency of the MEMS chip through an external clock frequency.

According to the monitoring method based on RF technology provided by the present application, the idle mode includes: a deep sleep mode and a light sleep mode; where the MEMS chip works in the light sleep mode when outputting the low level of the pulse sequence; and the MEMS chip works in the deep sleep mode when ending outputting the pulse sequence.

In a second aspect, the present application further provides a monitoring device base on radio frequency (RF) technology, including a micro-electro-mechanical system (MEMS) chip, an RF circuit and an antenna; where
  the MEMS chip is configured to collect monitoring information of a target object, and output a pulse sequence carrying the monitoring information to an oscillator and a power amplifier in an RF circuit through the MEMS chip; where the monitoring information is characterized through the pulse sequence by a time interval between two adjacent pulses;
  the RF circuit is configured to modulate a phase of a generated carrier by the oscillator according to the pulse sequence, and amplify a modulated signal by the power amplifier; and
  the antenna is configured to transmit an amplified signal;
  where the MEMS chip works in an operation mode when the MEMS chip outputs a high level of the pulse sequence; and the MEMS chip works in an idle mode when the MEMS chip outputs a low level of the pulse sequence or ends outputting the pulse sequence.

According to the monitoring device based on RF technology provided by the present application, the monitoring device further includes a battery, where positive and negative electrode pins of the battery are customized according to a layout of circuits and structures of the monitoring device; and the MEMS chip, the RF circuit and the battery are installed on a printed circuit board (PCB), the battery maintains a certain distance from a surface of the PCB through the positive and negative pins, and electronic components are installed on the surface of the PCB below the battery.

According to the monitoring device based on RF technology provided by the present application, the antenna and the MEMS chip are installed on an upper surface of the PCB, where the MEMS chip is installed at a center of the PCB, and the antenna is installed outside the MEMS chip;

the oscillator, the power amplifier and the battery are installed on a lower surface of the PCB, where the oscillator and the power amplifier are installed on a surface of the PCB below the battery; and signal lines and power lines are arranged in an inner layer of the PCB, and a copper grounding is laid on an inner layer of the PCB.

According to the monitoring device based on RF technology provided by the present application, the monitoring device is a tire pressure monitoring device, which is installed on a valve or a valve extension tube of a tire, and communicates with an air hole of the valve or the valve extension tube.

According to the monitoring device based on RF technology provided by the present application, the monitoring device is formed by low pressure injection molding of polyamide hot melt adhesive.

In the monitoring method and device based on RF technology provided in the present application, the sensors and microprocessors are integrated into one chip through a MEMS chip, making the product has a high degree of integration, and facilitating centralized and efficient management, which can effectively reduce the size of the monitoring device, improve the simplicity of the monitoring device, reduce the design difficulty of the software and hardware of the monitoring device, reduce the complexity of the manufacturing process and the difficulty of testing, reduce the power consumption of the monitoring device, be beneficial to the mass production of products, has higher economic practicability, be more suitable for industrial production and commercial application, and be in line with the development trend of technology. The present application facilitates power management by adopting the structure of MEMS chip with external RF unit circuit. By setting the operation mode and idle mode in the MEMS chip, in the idle mode, the MEMS chip operates in a low power state, while the RF circuit is turned off, and the MEMS chip only works in the operation mode when transmitting the pulse of monitoring information to the RF circuit. Thus, the time of the operation mode of the MEMS chip can be shorten, thereby effectively reducing the power consumption of the MEMS chip and the RF circuit, and realizing the low power consumption of the monitoring device.

BRIEF DESCRIPTION OF DRAWINGS

To more clearly illustrate the solutions of the present application or prior art, accompanying drawings used in the description of the embodiments or the prior art are briefly introduced below. The drawings in the following description only show some embodiments of the present application. For those of ordinary skill in the art, other drawings may also be obtained according to these drawings without creative effort.

DETAILED DESCRIPTION OF THE EMBODIMENTS

In order to make the objectives, solutions and advantages of the embodiments of the present application clearer, the solutions of the embodiments of the present application are clearly and completely described in combination with the accompanying drawings of the embodiments of the present application. The embodiments described are a part of the embodiments of the present application, rather than all the embodiments. Based on the embodiments of the present application, all other embodiments obtained by those of ordinary skill in the art without creative effort fall within the scope of protection of the present application.

A monitoring method and a monitoring device based on radio frequency (RF) technology will be described below with reference to FIG. 1 to FIG. 8.

Figure 1:
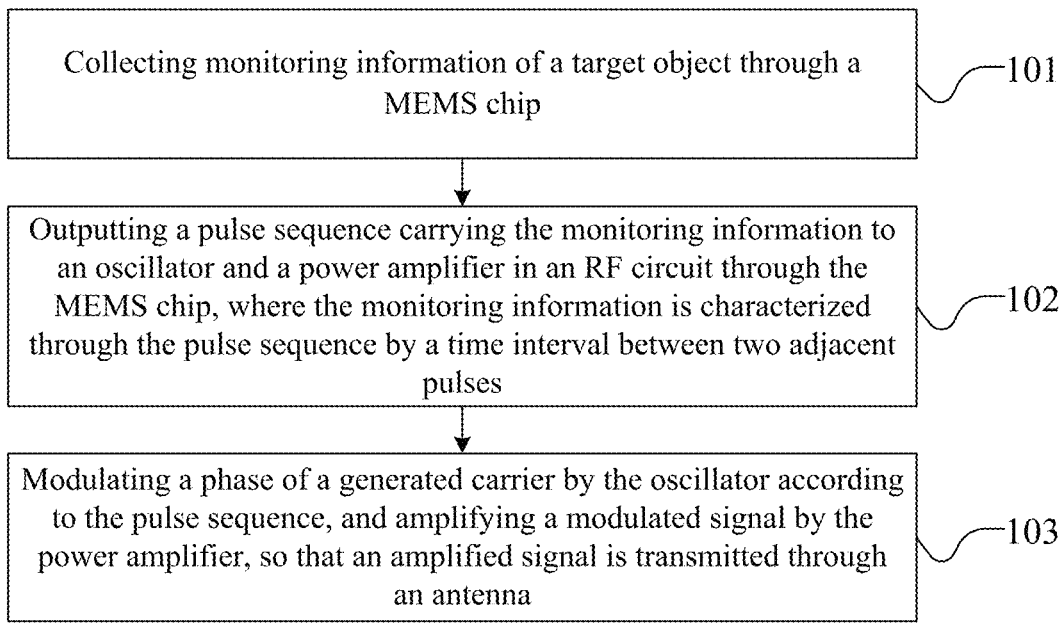
FIG. 1 is a flow diagram of a monitoring method based on RF technology provided by the present application.

Referring to FIG. 1, namely a flow diagram of a monitoring method based on RF technology provided by the present application, the method can be performed by a monitoring device based on RF technology. As shown in FIG. 1, the method includes at least the following steps.

Step 101, collecting monitoring information of a target object through a micro-electro-mechanical system (MEMS) chip.

In the embodiments of the present application, a MEMS chip is integrated with sensors and microprocessors, where the sensors integrated by the MEMS chip can be used to collect the information of the monitored target object, and the microprocessors integrated by the MEMS chip can be used to process the information of the monitored target object collected by the sensors to obtain the monitoring information of the monitored target object. The MEMS chip can further integrate functions of a voltage detector, a low frequency receiver and the like, and the embodiments of the present application do not limit the functions of the MEMS chip. For example, when the monitored target object is a tire, the pressure and temperature of the gas in the tire and the acceleration of the tire rotation can be collected through the MEMS chip, and the collected information can be processed to obtain the monitoring information of the tire. The embodiments of the present application do not limit the types of the monitored target object, and the types of the monitored target object can be determined according to the application field of the monitoring method.

Step 102, outputting a pulse sequence carrying the monitoring information to an oscillator and a power amplifier in a RF circuit through the MEMS chip; where the monitoring information is characterized through the pulse sequence by a time interval between two adjacent pulses.

In an embodiment of the present application, the RF circuit can perform modulation according to the monitoring information of the target object collected by the MEMS chip, and amplify a modulated signal, so as to obtain an RF signal for transmission. The RF circuit mainly includes an oscillator and a power amplifier. The embodiments of the present application do not limit the types of the oscillator and the power amplifier in the RF circuit. Where the oscillator can be a three-point oscillator, such as a parallel crystal oscillator. Since the oscillator needs to work in the amplification area of the transistor and has the characteristics of fast on/off, the transistor can be an NPN silicon RF transistor, and the oscillator also needs to meet the balance of phase and positive feedback amplitude. The power amplifier can be a general power amplifier, such as a common emitter amplifier or an integrated dedicated RF amplifier. The power amplifier also works in transistor amplification area, and can also be an NPN silicon RF transistor.

In an embodiment of the present application, the MEMS chip can be connected with the oscillator and the power amplifier in the RF circuit through a GPIO interface. For example, the MEMS chip can be connected with the oscillator through a GPIO 0 interface, and connected with the power amplifier through a GPIO 1 interface. Since the three-point oscillator and the general power amplifier work in the transistor amplification area, when the GPIO 0 and GPIO 1 interfaces of the MEMS chip have no pulse output, that is, the output data of the GPIO 0 and GPIO 1 interfaces are 0, the transistors of the three-point oscillator and the general power amplifier are in a cut-off state, and the theoretical power consumption of the RF circuit is 0 at this time. When the GPIO 0 and GPIO 1 interfaces of MEMS chips have pulse output, that is, the data output by GPIO 0 and GPIO 1 interfaces are 1, the transistor of the three-point oscillator begins to enter an amplification state to generate oscillation and performs modulation processing, and the transistor of the general power amplifier begins to enter the amplification state to amplify a modulated signal. At this time, the RF circuit has power consumption.

In an embodiment of the present application, the MEMS chip can have an operation mode and an idle mode. The pulse sequence carrying monitoring information which is output by the MEMS chip to an oscillator and a power amplifier through GPIO 0 and GPIO 1 interfaces includes high level and low level, where the high level and the low level refer to high and low positions of pulse voltage. When the voltage is high, it is called a high level, and when the pulse drops to the bottom, it is called a low level. The MEMS chip works in the operation mode when the MEMS chip outputs a high level of the pulse sequence carrying monitoring information to the oscillator and the power amplifier through the GPIO 0 and GPIO 1 interfaces, and the oscillator and the power amplifier are in the working state; the MEMS chip works in the idle mode when the MEMS chip outputs a low level of the pulse sequence carrying monitoring information to the oscillator and the power amplifier through the GPIO 0 and GPIO 1 interfaces, and the oscillator and the power amplifier are turned off at this time. Optionally, a push-pull mode or a standard IO mode can be used when the pulse sequence carrying monitoring information is output to the oscillator and the power amplifier through the GPIO 0 and GPIO 1 interfaces, which is not limited in the embodiments of the present application.

In an embodiment of the present application, the MEMS chip works in the operation mode when outputting other necessary work information, in addition to outputting the high level in the pulse sequence. For example, when the MEMS chip is in power-on self-checking, parameter setting, timer periodic wake-up, detecting current working mode, detecting information collected from target object (such as pressure, temperature, acceleration, brake pad thickness, and the like), calculating and processing collected information, setting next periodic wake-up time and other states, the MEMS chip needs to work in the operation mode.

In an embodiment of the present application, after the MEMS chip collects the monitoring information of the target object, the MEMS chip can generate the pulse sequence carrying the monitoring information according to the monitoring information of the target object, and the time interval between the two adjacent pulses in the pulse sequence is used to characterize the monitoring information of the target object. For example, the pulse sequence can be a microsecond-level ultrashort pulse sequence, a millisecond-level pulse sequence, or a nanosecond-level pulse sequence. The types of the pulse sequence are not limited in the embodiments of the present application. The embodiments of the present application do not limit the modes of generating the pulse sequence carrying monitoring information according to the monitoring information of the target object.

In Step 103, modulating a phase of a generated carrier by the oscillator according to the pulse sequence, and amplifying a modulated signal by the power amplifier, so that an amplified signal is transmitted through an antenna.

In an embodiment of the present application, after the oscillator and the power amplifier receive the pulse sequence carrying monitoring information output by the MEMS chip, the oscillator can modulate the phase of the carrier generated by the oscillator according to the pulse sequence, transmit the monitoring information of the target object by using amplitude variation offset of the carrier, and outputs the modulated signal to the power amplifier. The modulated signal is amplified by the power amplifier, and finally the amplified signal is transmitted through the antenna. Optionally, the RF circuit can be provided with an antenna impedance matching network. The power amplifier outputs the amplified signal to the antenna impedance matching network, and the amplified signal is transmitted through the antenna after passing through the antenna impedance matching network.

Optionally, the RF circuit can further be provided with components for stabilizing oscillation frequency, so as to ensure the stability of the oscillator during use. For example, the component for stabilizing oscillation frequency can be an acoustic surface wave resonator, and the types of the table oscillation frequency components is not limited in the embodiments of the present application.

In an embodiment of the present application, when the MEMS chip outputs the pulse sequence carrying monitoring information to the oscillator and the power amplifier, the MEMS chip can monitor the output of the pulse sequence carrying monitoring information in real time. When it is determined that the output of the pulse sequence carrying monitoring information ends, the MEMS chip works in idle mode and the RF circuit is turned off.

Optionally, the idle mode of the embodiments of the present application can include: a deep sleep mode and a light sleep mode; where the MEMS chip works in the light sleep mode when the low level of the pulse sequence is output; and the MEMS chip works in the deep sleep mode when the output of the pulse sequence is ended. Where the MEMS chip operates at different currents in the deep sleep mode and the light sleep mode. In the light sleep mode, the working current of the MEMS chip is at milliampere level, such as 0.3~1.2 mA, so as to ensure the rapid response to the pulse of transmitting monitoring information, the MEMS chip is in a state of low power consumption, and the RF circuit is in a closed state. In the deep sleep mode, the working current of MEMS chip is at microampere level, such as 0.07~0.4 µA, the MEMS chip operates in a state of very low power consumption, and the RF circuit is in a closed state.

That is, the MEMS chip works in the operation mode only when the MEMS chip transmits the monitoring information and outputs the high level of the pulse sequence carrying the monitoring information; the MEMS chip works in the light sleep mode when the MEMS chip transmits the monitoring information and outputs the low level of the pulse sequence carrying the monitoring information; the MEMS chip works in the deep sleep mode when the MEMS chip ends the transmission of monitoring information.

In the monitoring method based on RF technology provided in the present application, the sensors and microprocessors are integrated into one chip through the MEMS chip, making the product has a high degree of integration, and facilitating centralized and efficient management, which can effectively reduce the size of the monitoring device, improve the simplicity of the monitoring device, reduce the design difficulty of the software and hardware of the monitoring device, reduce the complexity of the manufacturing process and the difficulty of testing, reduce the power consumption of the monitoring device, be beneficial to the mass production of products, has higher economic practicability, be more suitable for industrial production and commercial application, and be in line with the development trend of technology. The present application facilitates power management by adopting the structure of MEMS chip with external RF unit circuit. By setting the operation mode and idle mode in the MEMS chip, in the idle mode, the MEMS chip operates in a low power state, while the RF circuit is turned off, and the MEMS chip only works in the operation mode when transmitting the pulse of monitoring information to the RF circuit. Thus, the time of the operation mode of the MEMS chip can be shorten, thereby effectively reducing the power consumption of the MEMS chip and the RF circuit, and realizing the low power consumption of the monitoring device.

In some optional embodiments of the present application, after the collecting of the monitoring information of the target object through the MEMS chip, the monitoring information can further be encapsulated into a data packet through the MEMS chip according to a preset communication protocol. Where the communication protocol is preset based on a pulse position offset algorithm; the outputting a pulse sequence carrying monitoring information to an oscillator and a power amplifier in the RF circuit through the MEMS chip, can be performed by determining the time interval between two adjacent pulses in the pulse sequence by the MEMS chip according to the data packet, and outputting the pulse sequence to the oscillator and the power amplifier in the RF circuit. By transmitting monitoring information through pulse, the monitoring device can still operate with low power consumption during the whole monitoring information transmission process.

Figure 2:
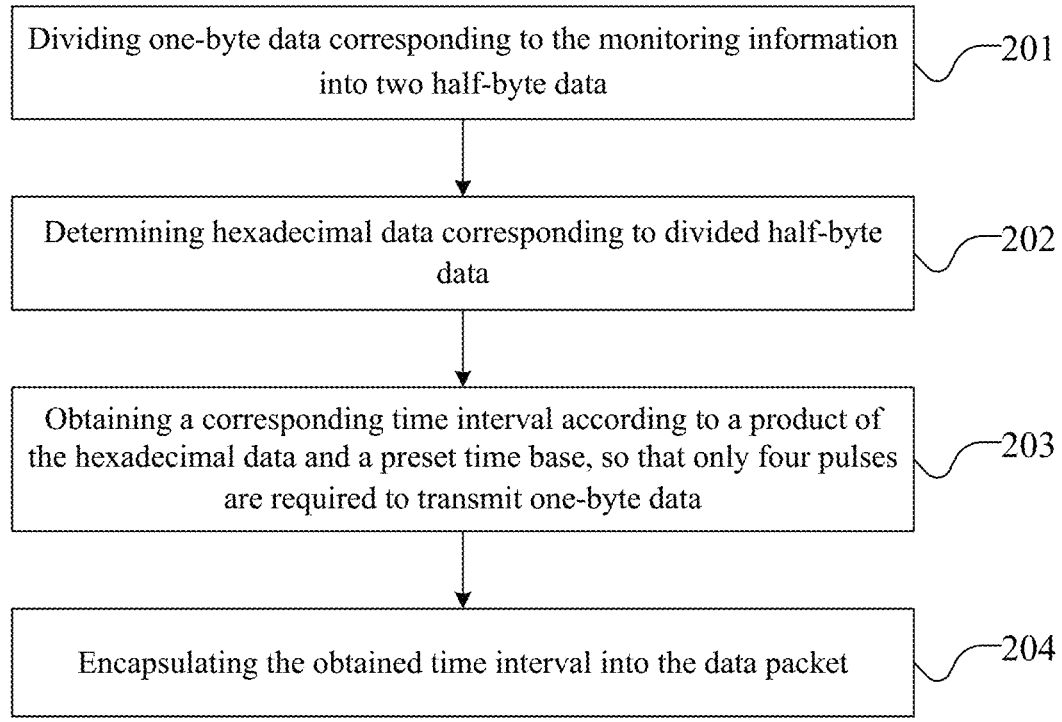
FIG. 2 is a flow diagram of encapsulating monitoring information into a data packet through a MEMS chip according to a preset communication protocol provided by the present application.

Referring to FIG. 2, namely a flow diagram of encapsulating monitoring information into a data packet through a MEMS chip according to a preset communication protocol provided by the present application, the encapsulating of the monitoring information into the data packet through the MEMS chip according to the preset communication protocol includes at least the followings.

Step 201, dividing one-byte data corresponding to the monitoring information into two half-byte data.

Step 202, determining hexadecimal data corresponding to divided half-byte data.

Step 203, obtaining a corresponding time interval according to a product of the hexadecimal data and a preset time base, so that only four pulses are required to transmit one-byte data.

Step 204, encapsulating the obtained time interval into the data packet.

In an embodiment of the present application, the time interval between two adjacent pulses in the pulse sequence can be determined through the pulse position offset algorithm according to the monitoring information, and the monitoring information can be transmitted by using the time interval between two adjacent pulses, that is, the relative position of the pulses. By formulating the pulse position offset algorithm into a communication protocol, the monitoring information can be converted into the time interval between two adjacent pulses in the pulse sequence, and the converted time interval information is encapsulated into a data packet according to the requirements of data transmission. Optionally, the pulse position migration algorithm can be encapsulated as a standard library function, which can be called directly when needed, thereby realizing applications in more fields.

In an embodiment of the present application, the monitoring information can be represented with one byte of 8-bit data. The pulse position offset algorithm is: firstly, dividing the one-byte data corresponding to the monitoring information into two half-byte 4 bit data; then, determining the hexadecimal data corresponding to the half-byte data, that is, 0-F; finally, obtaining the time interval corresponding to the hexadecimal data according to the product of the hexadecimal data and the preset time base, that is, the time constant. After obtaining the time interval corresponding to the monitoring information according to the pulse position offset algorithm, the time interval can be encapsulated into a packet with a preset size end, that is, LSB or MSB.

In an embodiment of the present application, the monitoring information is transmitted in the form of half byte, and one byte is divided into two groups with the low 4 bits and high 4 bits for transmission, so that each group corresponds to a pair of adjacent pulses in the pulse sequence and only four pulses are required to transmit one-byte data, which can shorten the time of monitoring information output and improve the efficiency of monitoring information output.

Figure 3:
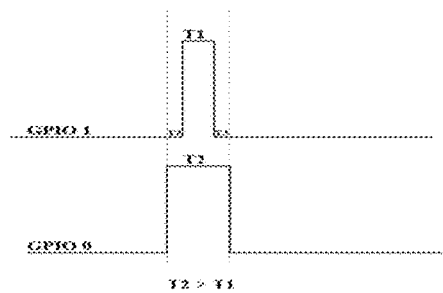
FIG. 3 is a diagram reflecting a temporal relationship of pulses in a pulse sequence output by a MEMS chip to an oscillator and a power amplifier in a RF circuit provided by the present application.

The RC oscillator inside the MEMS chip has low power consumption, while the generated error of the clock frequency is large, and the power consumption is large after starting the clock oscillator outside the MEMS chip, while the clock frequency stability of the clock oscillator is high. Therefore, in some optional embodiments of the present application, the main clock frequency adopts the internal clock frequency of the MEMS chip to ensure ultra-low power consumption. In the process of outputting the pulse sequence carrying monitoring information to the oscillator and the power amplifier in the RF circuit through the MEMS chip, the MEMS chip can compare its external clock frequency with its internal clock frequency, and correct the difference value of the internal clock frequency by using its external clock frequency, so that the clock frequency or crystal oscillator frequency of the MEMS chip can keep stable, thereby ensuring the stability of the pulse period of the output pulse sequence. In some optional embodiments of the present application, the MEMS chip can output a first pulse to the oscillator and output a second pulse to the power amplifier when the MEMS chip outputs the pulse sequence carrying monitoring information to the oscillator and the power amplifier in the RF circuit, where the duration of the first pulse is greater than that of the second pulse. FIG. 3 is a diagram reflecting a temporal relationship of pulses in a pulse sequence output by a MEMS chip to an oscillator and a power amplifier in a RF circuit provided by the present application, where T1 is 2 μS and T2 is 4 μS. Since the start-up time of the transistor of the oscillator from the cut-off state to the oscillation state is longer than that of the transistor of the power amplifier from the cut-off state to the amplification state, by setting the duration of the oscillator pulse to be greater than the duration of the power amplifier pulse, more precise control can be realized and the power consumption of the monitoring device can be further reduced.

In some optional embodiments of the present application, before outputting the pulse sequence carrying monitoring information to the oscillator and the power amplifier in the RF circuit through the MEMS chip, synchronous pulses can further be output to the oscillator and the power amplifier through the MEMS chip, so that the oscillator and the power amplifier can synchronize according to the clock of the synchronous pulse, and the oscillator and power amplifier can be provided with clock synchronization. For example, the synchronous pulse can be a microsecond level synchronous pulse, or a millisecond level synchronous pulse, or a nanosecond level synchronous pulse or the like, and the embodiments of the present application do not limit the types of the synchronous pulse. By calibrating the clock of the oscillator and the power amplifier before transmitting the monitoring information, clock synchronization of the oscillator and the power amplifier can be enabled which can ensure the synchronization of the oscillation state of the oscillator and the amplification state of the power amplifier. During monitoring information transmission, the modulation signal generated by the oscillator can be amplified in time after being input to the power amplifier, so as to effectively ensure the efficiency of monitoring information transmission.

The monitoring device based on RF technology provided in the present application will be described below. The monitoring device based on RF technology described below and the monitoring method based on RF technology described above can be referred to each other.

Figure 4:
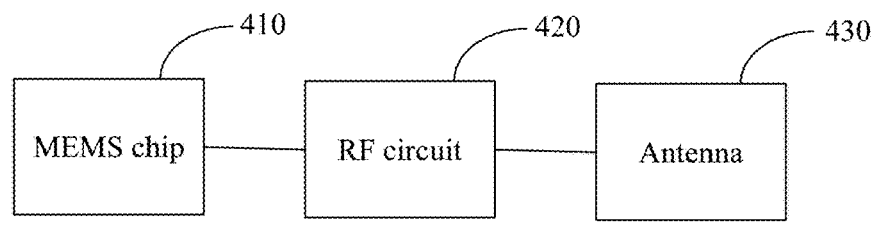
FIG. 4 is a composition structure diagram of a monitoring device based on RF technology provided by the present application.

FIG. 4 is a composition structure diagram of a monitoring device based on RF technology provided by the present application. The monitoring device based on RF technology shown in FIG. 4 can be used to perform the monitoring method based on RF technology shown in FIG. 1. As shown in FIG. 4, the monitoring device based on RF technology includes at least the following components.

a MEMS chip 410, configured to collect monitoring information of a target object, and output a pulse sequence carrying the monitoring information to an oscillator and a power amplifier in an RF circuit; where the monitoring information is characterized through the pulse sequence by a time interval between two adjacent pulses;

a RF circuit 420, configured to modulate a phase of a generated carrier by the oscillator according to the pulse sequence, and amplify a modulated signal by the power amplifier; and an antenna 430, configured to transmit the amplified signal.

Where the MEMS chip 410 works in an operation mode when the MEMS chip 410 outputs a high level of the pulse sequence; and the MEMS chip 410 works in an idle mode when the MEMS chip 410 outputs a low level of the pulse sequence or ends outputting the pulse sequence.

Figures 5A, 5B:
FIG. 5A and FIG. 5B are diagrams of a battery welded with positive and negative electrode pins according to a circuit layout provided by the present application.

In some optional embodiments of the present application, the monitoring device based on RF technology can further include a battery in addition to the MEMS chip 410, the RF circuit 420 and the antenna 430, such as a lithium battery that can adopts specifications such as CR1225, BR1225, CR1220 or BR1220, whose size is smaller than the lithium battery in the tire pressure monitoring device in the prior art. The specification of battery used in the monitoring device is not limited in the embodiments of the present application. Where lithium batteries of 1225 or 1220 specifications produced by the battery factories do not have positive and negative electrode pins connected with the positive and negative electrodes of a printed circuit board (PCB) through welding. Therefore, the positive and negative electrode pins of the battery used in the embodiments of the present application can be customized according to a layout of the circuits and structures of the monitoring device. FIG. 5A and FIG. 5B are diagrams of a battery welded with positive and negative electrode pins according to a circuit layout provided by the present application, where 441 and 442 are the positive and negative electrode pins of a battery 440 customized according to the circuit layout. The MEMS chip, the RF circuit and the battery of the monitoring device of the present application are installed on a printed circuit board. Optionally, the battery may maintain a certain distance from a surface of the PCB through the positive and negative electrode pins, so that there is a certain space between the battery and the PCB, and electronic components can be installed on the surface of the PCB below the battery to maximize the use of space and further reduce the size of the monitoring device.

In some optional embodiments of the present application, the monitoring device based on RF technology can install the antenna 430 and MEMS chip 410 on an upper surface of the PCB. Where the MEMS chip 410 can be installed at a center of the PCB, and the antenna 430 can be installed outside the MEMS chip 410. The oscillator, the power amplifier and the battery can be installed on a lower surface of the PCB. Where the battery maintains a certain distance from the surface of the PCB through the positive and negative electrode pins; the oscillator and the power amplifier can be installed on a surface of the PCB below the battery; signal lines and power lines can be arranged in an inner layer of the PCB, and copper grounding is laid on an inner layer of the PCB. If a surface acoustic wave resonator is used to stabilize the oscillation frequency in the RF circuit, the inner layer of the PCB adjacent to the surface of the resonator is coated with copper, so as to avoid the feedback coupling between the resonator and other lines which will result in instability of the oscillator. The structure mentioned above can make the structure of the monitoring device more compact and further reduce the size of the monitoring device.

Optionally, the PCB can adopt a 4-layer board stacking design. The 4-layer board stacking design can allow the PCB to have good electromagnetic compatibility, and can obtain a reasonable layout. The material of the PCB can be FR-4. The embodiments of the present application do not limit the composition structures and materials of the PCB.

Figure 6:
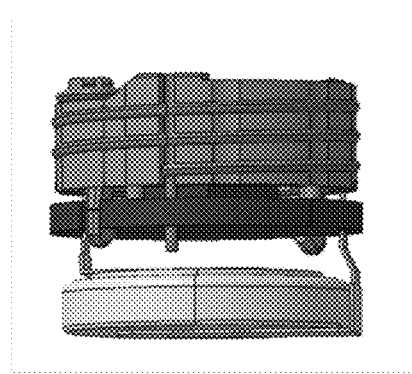
FIG. 6 is a composition structure diagram showing installing a battery, an antenna and a PCB of a monitoring device provided by the present application.

FIG. 6 is a composition structure diagram showing installing a battery, an antenna and a printed circuit board of a monitoring device provided by the present application. Where the antenna 430 is installed on an upper surface of the PCB 450, and the MEMS chip 410 can be installed on the surface of the PCB 450 at the center of the antenna 430. The battery 440 is installed on a lower surface of the PCB 450, through the positive and negative electrode pins, maintaining a certain distance from a surface of the printed circuit board 450. The oscillator, the power amplifier and other components such as capacitors and resistors can be installed on a surface of the PCB 450 below the battery 440. The inner layer of the PCB is arranged with signal lines, power lines and copper grounding. The size of the monitoring device with the structure mentioned above can be 14 mm in diameter and 12.5 mm in height.

In some optional embodiments of the present application, the monitoring device provided in the embodiments of the present application can be a tire pressure monitoring device, which is installed on the valve or valve extension tube of a tire, and connected with an air hole of the valve or valve extension tube used for charging and discharging, so as to collect the pressure and temperature of the gas in the tire and the rotational acceleration of the tire. The embodiments of the present application, by integrating the monitoring device with the valve or the valve extension tube, can prevent the existing monitoring device from using adhesive tape or solvent to adhere the detection device to the inner surface of the tire, and the problem that the secondary use of the removed monitoring device is very difficult when the tire needs to be replaced, which results in low product reuse rate. The embodiments of the present application can also greatly save the installation time of the monitoring device and facilitate disassembly, increase the repeated use of the product, and meet the requirements of environmental protection. In addition, it is not necessary to disassemble the monitoring device when charging and discharging. Referring to the difference in the protruding modes of various valve on the automobile wheel hub, the structural limitations of various narrow and spatial interference at the valve outlet, adopting the structure of integrating the monitoring device with the valve or the valve extension tube according to the embodiments of the present application is more suitable for various complex tire rim environments.

In some optional embodiments of the present application, the monitoring device can be formed by low pressure injection molding of polyamide hot melt adhesive. Due to the low melting point of polyamide hot melt adhesive, it can be processed and formed under low pressure, which will not destroy the components in the printed circuit board, and can protect the components from damage. When the dissolved polyamide hot melt adhesive coating cover monitoring device is adopted, it can be ensured that the product has reliable waterproofness and tire gas pressure resistance.

Figure 7:
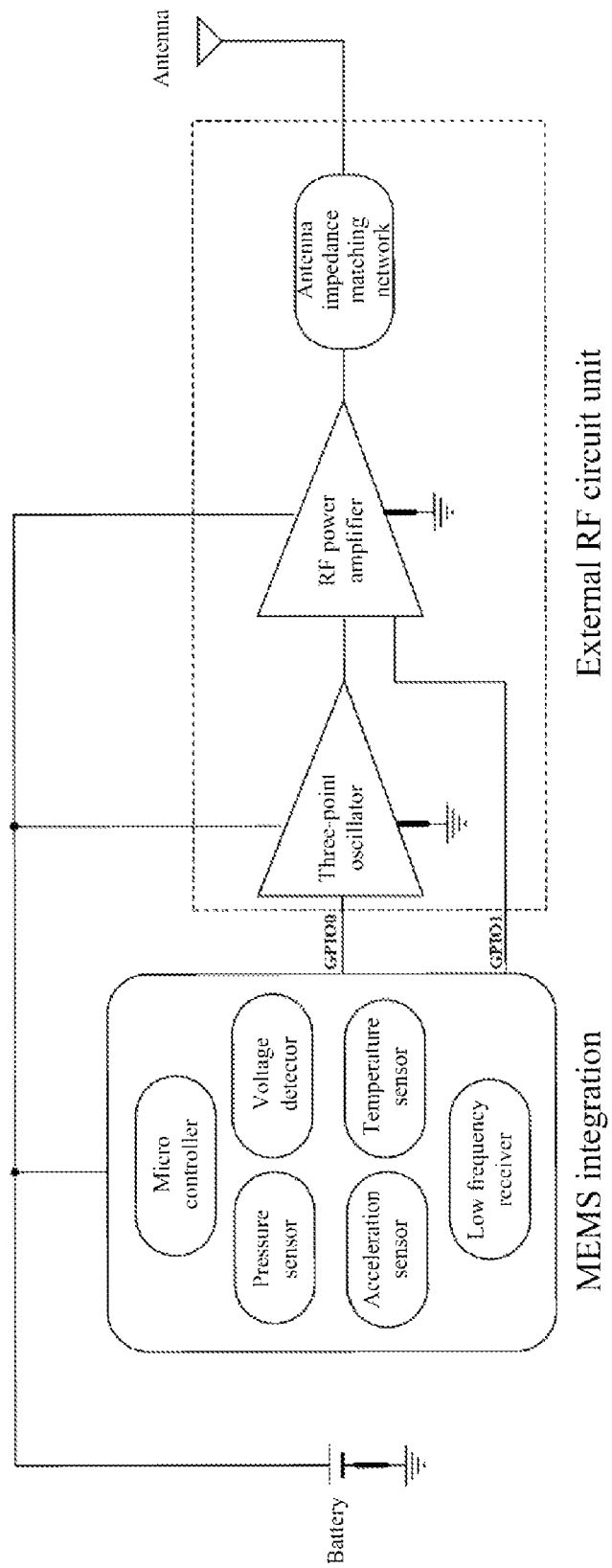
FIG. 7 is a specific composition structure diagram of a monitoring device based on RF technology provided by the present application.
Figure 8:
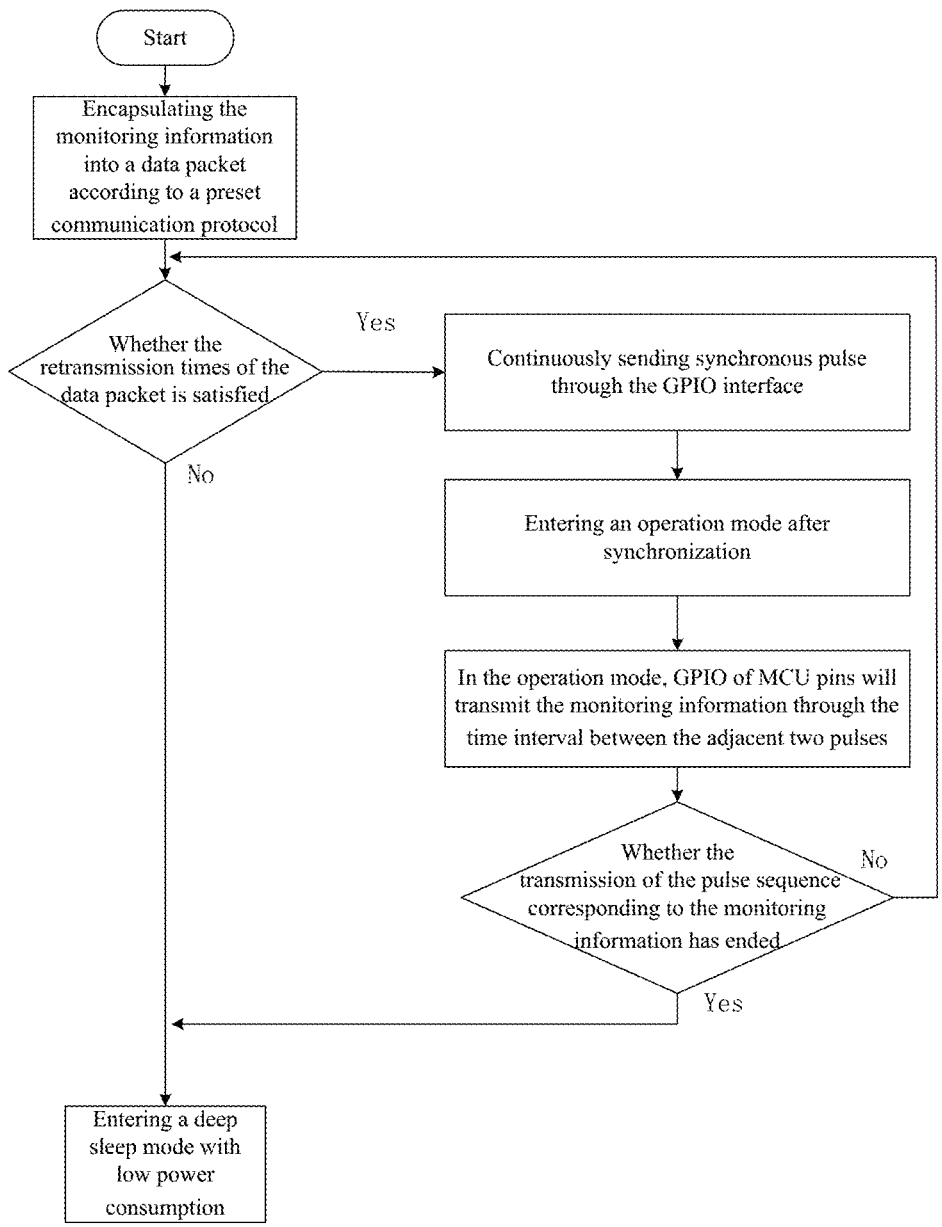
FIG. 8 is a flow diagram of a specific application scenery of a monitoring method based on RF technology provided by the present application.

In a specific application scenario of the embodiments of the present application, a specific composition structure diagram of a monitoring device based on RF technology and a flow diagram of a specific application scenario of a monitoring method based on RF technology are shown in FIG. 7 and FIG. 8.

Where the monitoring device includes: a MEMS chip, an RF circuit, an antenna and a battery. Where a pressure sensor, a temperature sensor, an acceleration sensor, a microprocessor, a voltage detector and a low-frequency receiver are integrated in the MEMS chip. The RF circuit includes a three-point oscillator, an RF power amplifier, an antenna impedance matching network and an antenna. The battery is connected with the MEMS chip, the three-point oscillator and the RF power amplifier to provide power to the MEMS chip, the three-point oscillator and the RF power amplifier. The MEMS chip is connected with the three-point oscillator and the RF power amplifier through GPIO 0 and GPIO 1 interfaces.

Where the MEMS chip collects the pressure and temperature of the gas in the tire and the rotational acceleration of the tire by integrating pressure sensors, temperature sensors and acceleration sensors. The MEMS chip processes the pressure, temperature and acceleration collected by the sensor through an integrated microprocessor to obtain the monitoring information of the tire, and encapsulates the monitoring information into a data packet according to the preset communication protocol by using the microprocessor. Then the MEMS chip uses the microprocessor to determine the mark bit of retransmission times and whether the retransmission times of the data packet is satisfied. If it is satisfied, the MEMS chip uses the microprocessor to output a microsecond level synchronous pulse to the RF circuit through the GPIO interface, and calibrates the system clock to synchronize the three-point oscillator after startup with the RF power amplifier according to the synchronous pulse clock. Then the MEMS chip enters the operation mode, and transmits the microsecond pulse sequence corresponding to the data packet through the GPIO interface to the three-point oscillator and the RF power amplifier, and characterizes the transmission monitoring information by the time interval between the adjacent two pulses. The MEMS chip determines, using the microprocessor, whether the transmission of the microsecond-level pulse sequence corresponding to the monitoring information has ended. If it has ended, the MEMS chip enters a deep sleep mode with low power consumption. If it has not ended, the MEMS chip determines the mark bit of retransmission times and whether the retransmission times of the data packet is satisfied, and then the transmission of data packets continues.

In the embodiments of the presents application, due to adopting the microsecond pulse, the duration is short, the power-supply battery does not need to maintain large current output for a long time, thus the additional circuit around the battery can be simplified and the cost related with maintenance can be further saved.

Using the monitoring device of the embodiments of the present application to monitor the tire pressure of the vehicle, and calculating by transmitting a frame of data with 8 bytes, the time for transmitting a frame of data is about 5.2 mS, the transmitting power is about 10 dBm, and the current consumption for measuring the average power consumption of the emission is only 1 mA. Compared with the solution of using FSK or ASK technology to integrate RF circuit into the MEMS chip for monitoring the tire pressure of the vehicle, the time for transmitting a frame of data with 8 bytes is about 8~10 mS, and the current consumption for measuring the average power consumption of the emission is 10~12 mA. The time and power consumption of transmitting the same amount of data in this application are much lower than those of the integrating RF circuit in the MEMS chip using FSK or ASK technology. Where the FSK stands for frequency shift keying, that is, using digital signals to modulate the frequency of the carrier, and is a modulation method used earlier in information transmission. The most common one is a dual-frequency FSK system with two frequencies carrying binary 1 and 0. In addition, there is also a multi-band frequency shift keying representing multiple symbols, referred to as multi-band modulation. The ASK, which stands for amplitude shift keying, is a relatively simple modulation, equivalent to amplitude modulation in analog signals, but multiplied by carrier frequency signals is binary digital. The amplitude shift takes the frequency and phase as constants, and the amplitude as a variable, and the information bits are transmitted through the amplitude of the carrier.

The monitoring method and device based on RF technology provided by the embodiments of the present application can be extended to be applied in various fields, such as thickness monitoring of automobile brake, cleanliness monitoring of air wireless filter, intelligent wireless door lock status monitoring of cold chain cabinet, wireless monitoring of oil level, and the like, thereby satisfying the design requirements of miniaturized wireless monitoring in various fields.

The device embodiments described above is only schematic, in which the unit described as a separation component may be or may not be physically separated, and the component displayed as a unit may be or may not be a physical unit. That is, it may be located in a position or may be distributed to multiple network units. Some or all of the modules may be selected according to the actual needs to achieve the purpose of the scheme of the embodiments. Those of ordinary skill in the art may understand and implement the embodiments without creative work.

Through the description of the above embodiment methods, technicians in this field may clearly understand that each embodiment may be realized by software and the necessary general hardware platform, and of course, it can also be realized by hardware. Based on such understandings, the above-mentioned solution can be embodied in the form of a software product in essence or the part that makes contribution to the prior art. The computer software product can be stored in a computer readable storage medium, such as a ROM/RAM, a disk, an optical disk, and the like, including a number of instructions to enable a computer device (which can be a personal computer, a server, or network equipment) to perform the methods described in each embodiment or some parts of the embodiments.

Finally, it should be noted that the above embodiments are only used to illustrate the solutions of the present application, rather than limiting the solutions. Although the present application is described in detail with reference to the above embodiments, those of ordinary skill in the art should understand that they may still modify the solutions recorded in the above embodiments, or make equivalent replacements to some of the features; these modifications or replacements do not make the essence of the corresponding solutions depart from the scope of the solutions of various embodiments of the present application.

What is claimed is:

1. A monitoring method based on radio frequency (RF) technology, comprising:
   collecting monitoring information of a target object through a micro-electro-mechanical system (MEMS) chip; and
   outputting a pulse sequence carrying the monitoring information to an oscillator and a power amplifier in an RF circuit through the MEMS chip, wherein the monitoring information is characterized through the pulse sequence by a time interval between two adjacent pulses; modulating a phase of a generated carrier by the oscillator according to the pulse sequence, and amplifying a modulated signal by the power amplifier, so that an amplified signal is transmitted through an antenna;
   wherein the outputting the pulse sequence carrying the monitoring information to the oscillator and the power amplifier in the RF circuit through the MEMS chip, further comprises:
   correcting an internal clock frequency of the MEMS chip through an external clock frequency;
   wherein the MEMS chip works in an operation mode when the MEMS chip outputs a high level of the pulse sequence; and the MEMS chip works in an idle mode when the MEMS chip outputs a low level of the pulse sequence or ends outputting the pulse sequence, wherein when the MEMS chip works in the idle mode, the RF circuit is turned off,
   wherein the idle mode comprises: a deep sleep mode and a light sleep mode; wherein the MEMS chip works in the light sleep mode when outputting the low level of the pulse sequence; and the MEMS chip works in the deep sleep mode when ending outputting the pulse sequence.

2. The monitoring method based on RF technology according to claim 1, wherein after the collecting monitoring information of a target object by the MEMS chip, the method further comprises:
   encapsulating the monitoring information into a data packet through the MEMS chip according to a preset communication protocol, wherein the communication protocol is preset based on a pulse position offset algorithm;
   the outputting a pulse sequence carrying the monitoring information to an oscillator and a power amplifier in an RF circuit through the MEMS chip, comprises:
   determining the time interval between the two adjacent pulses in the pulse sequence through the MEMS chip according to the data packet, and outputting the pulse sequence to the oscillator and the power amplifier in the RF circuit.

3. The monitoring method based on RF technology according to claim 2, wherein the encapsulating the monitoring information into a data packet according to the preset communication protocol, comprises:
   dividing one-byte data corresponding to the monitoring information into two half-byte data;
   determining hexadecimal data corresponding to divided half-byte data;
   obtaining a corresponding time interval according to a product of the hexadecimal data and a preset time base, so that only four pulses are required to transmit one-byte data; and
   encapsulating the obtained time interval into the data packet.

4. A monitoring device based on radio frequency (RF) technology, comprising a micro electro mechanical system (MEMS) chip, an RF circuit and an antenna; wherein
   the MEMS chip is configured to collect monitoring information of a target object, and output a pulse sequence carrying the monitoring information to an oscillator and a power amplifier in an RF circuit through the MEMS chip; wherein the monitoring information is characterized through the pulse sequence by a time interval between two adjacent pulses, wherein when outputting the pulse sequence carrying the monitoring information to the oscillator and the power amplifier in the RF circuit through the MEMS chip, the MEMS chip is further configured to correct an internal clock frequency of the MEMS chip through an external clock frequency;

the RF circuit is configured to modulate a phase of a generated carrier by the oscillator according to the pulse sequence, and amplify a modulated signal by the power amplifier; and the antenna is configured to transmit an amplified signal;

wherein the MEMS chip works in an operation mode when the MEMS chip outputs a high level of the pulse sequence; and the MEMS chip works in an idle mode when the MEMS chip outputs a low level of the pulse sequence or ends outputting the pulse sequence, wherein when the MEMS chip works in the idle mode, the RF circuit is turned off, wherein the idle mode comprises: a deep sleep mode and a light sleep mode; wherein the MEMS chip works in the light sleep mode when outputting the low level of the pulse sequence; and the MEMS chip works in the deep sleep mode when ending outputting the pulse sequence.

5. The monitoring device based on RF technology according to claim 4, further comprising a battery, wherein positive and negative electrode pins of the battery are customized according to a layout of circuits and structures of the monitoring device; and the MEMS chip, the RF circuit and the battery are installed on a printed circuit board (PCB), the battery maintains distance from a surface of the PCB through the positive and negative pins, and electronic components are installed on the surface of the PCB below the battery.

6. The monitoring device based on RF technology according to claim 5, wherein the antenna and the MEMS chip are installed on an upper surface of the PCB, wherein the MEMS chip is installed at a center of the PCB, and the antenna is installed outside the MEMS chip;

the oscillator, the power amplifier and the battery are installed on a lower surface of the PCB, wherein the oscillator and the power amplifier are installed on a surface of the PCB below the battery; and signal lines and power lines are arranged in an inner layer of the PCB, and a copper grounding is laid on an inner layer of the PCB.

7. The monitoring device based on RF technology according to claim 4, wherein the monitoring device is a tire pressure monitoring device, which is installed on a valve or a valve extension tube of a tire, and communicates with an air hole of the valve or the valve extension tube.

8. The monitoring device based on RF technology according to claim 7, wherein the monitoring device is formed by low pressure injection molding of polyamide hot melt adhesive.

\* \* \* \* \*